(12) United States Patent
Hendry et al.

(10) Patent No.: US 7,228,046 B1
(45) Date of Patent: Jun. 5, 2007

(54) ENVIRONMENTALLY STABLE ELECTRO-OPTIC DEVICE AND METHOD FOR MAKING SAME

(75) Inventors: Loren M. Hendry, Glendale, AZ (US); Jeffrey E. Lewis, Phoenix, AZ (US); Jason C. Grooms, St. Petersburg, FL (US); Charles B. Gray, Peoria, AZ (US)

(73) Assignee: Honeywell International, Inc., Morristown, NJ (US)

( * ) Notice: Subject to any disclaimer, the term of this patent is extended or adjusted under 35 U.S.C. 154(b) by 156 days.

(21) Appl. No.: 11/286,082

(22) Filed: Nov. 23, 2005

(51) Int. Cl.
*G02B 6/10* (2006.01)
*H01L 21/00* (2006.01)

(52) U.S. Cl. .......................... 385/132; 438/38; 438/22
(58) Field of Classification Search .................. 438/38; 359/88, 8; 385/132
See application file for complete search history.

(56) References Cited

U.S. PATENT DOCUMENTS

| | | | | |
|---|---|---|---|---|
| 3,969,164 A | * | 7/1976 | Cho et al. .................. | 117/106 |
| 5,475,772 A | | 12/1995 | Hung et al. | |
| 5,517,344 A | * | 5/1996 | Hu et al. ..................... | 349/153 |
| 5,578,502 A | * | 11/1996 | Albright et al. .............. | 438/95 |
| 6,560,377 B2 | * | 5/2003 | Jones et al. ..................... | 385/2 |

* cited by examiner

*Primary Examiner*—Michelle Connelly-Cushwa
*Assistant Examiner*—Rhonda S. Peace
(74) *Attorney, Agent, or Firm*—Ingrassia Fisher & Lorenz

(57) ABSTRACT

A method is provided for stabilizing an electro-optic substrate employed in a waveguide device. The method comprises cleaning a surface of the substrate, and exposing the device to a reactive oxide to passivate the surface. A layer of sealant is deposited on the substrate in a vacuum to seal the surface.

15 Claims, 2 Drawing Sheets

ENVIRONMENTALLY STABLE ELECTRO-OPTIC DEVICE AND METHOD FOR MAKING SAME

STATEMENT REGARDING FEDERALLY SPONSORED RESEARCH OR DEVELOPMENT

This invention was made with Government support under Contract No. 009 Z 9004 awarded by Boeing. The Government has certain rights in this invention.

FIELD OF THE INVENTION

The present invention generally relates to an electro-optic device and, more particularly, to a process for stabilizing the electro-optic substrate of an optical waveguide device for operation under atypical environments and conditions.

BACKGROUND OF THE INVENTION

Optical communications systems now routinely employ electro-optic devices (e.g., integrated optic or multi-functional chips) that utilize electrodes to modulate optical signals propagating through an optical waveguide formed in an optically transmissive substrate and optically coupled between an input optical fiber and one or more output optical fibers. The substrate typically comprises an electro-optic crystal, such as lithium niobate ($LiNbO_3$), on which optical waveguides may be formed by various means. Generally in such optical modulators, one or more waveguides are formed proximate to the upper surface of the substrate, and one or more surface electrodes are deposited on the surface proximate to the waveguides. When a voltage is applied to the surface electrodes, the phase of the light propagating through the waveguide is advanced or retarded. This effect may be employed to produce an optically modulated signal.

While known electro-optic devices function adequately in moderate environments, their performance may quickly degrade when operating under atypical or harsh conditions (e.g., in an environment characterized by extreme temperatures, humidities, pressures, etc., or an environment that experiences flux in such characteristics). When operating in vacuum-like conditions, for example, the electro-optic substrate in which the waveguide is formed experiences chemical changes over time as oxygen and hydrogen ions disassociate from the substrate's surface. This may result in significant performance degradation. For this reason, known electro-optic devices are not designed for or well-suited for applications that require operation under extreme conditions, especially space applications (e.g., use within a fiber optic gyroscope deployed on a spacecraft). Additionally, the performance of conventional electro-optic devices is known to degrade with exposure to radiation, including x-ray radiation.

It should thus be appreciated that it would be desirable to provide a method for adapting known electro-optic devices for operation under atypical or harsh conditions, including vacuum-like environments and radiation rich environments. Furthermore, it would be desirable to provide a method for stabilizing the surface of the optically transmissive substrate employed in an electro-optic device configured for operation in space. Other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for stabilizing an electro-optic substrate employed in a waveguide device. The method comprises cleaning a surface of the substrate, and exposing the device to a reactive oxide to passivate the surface. A layer of sealant is deposited on the substrate in a vacuum to seal the surface.

BRIEF DESCRIPTION OF THE DRAWINGS

The present invention will hereinafter be described in conjunction with the following drawing figures, wherein like numerals denote like elements, and.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
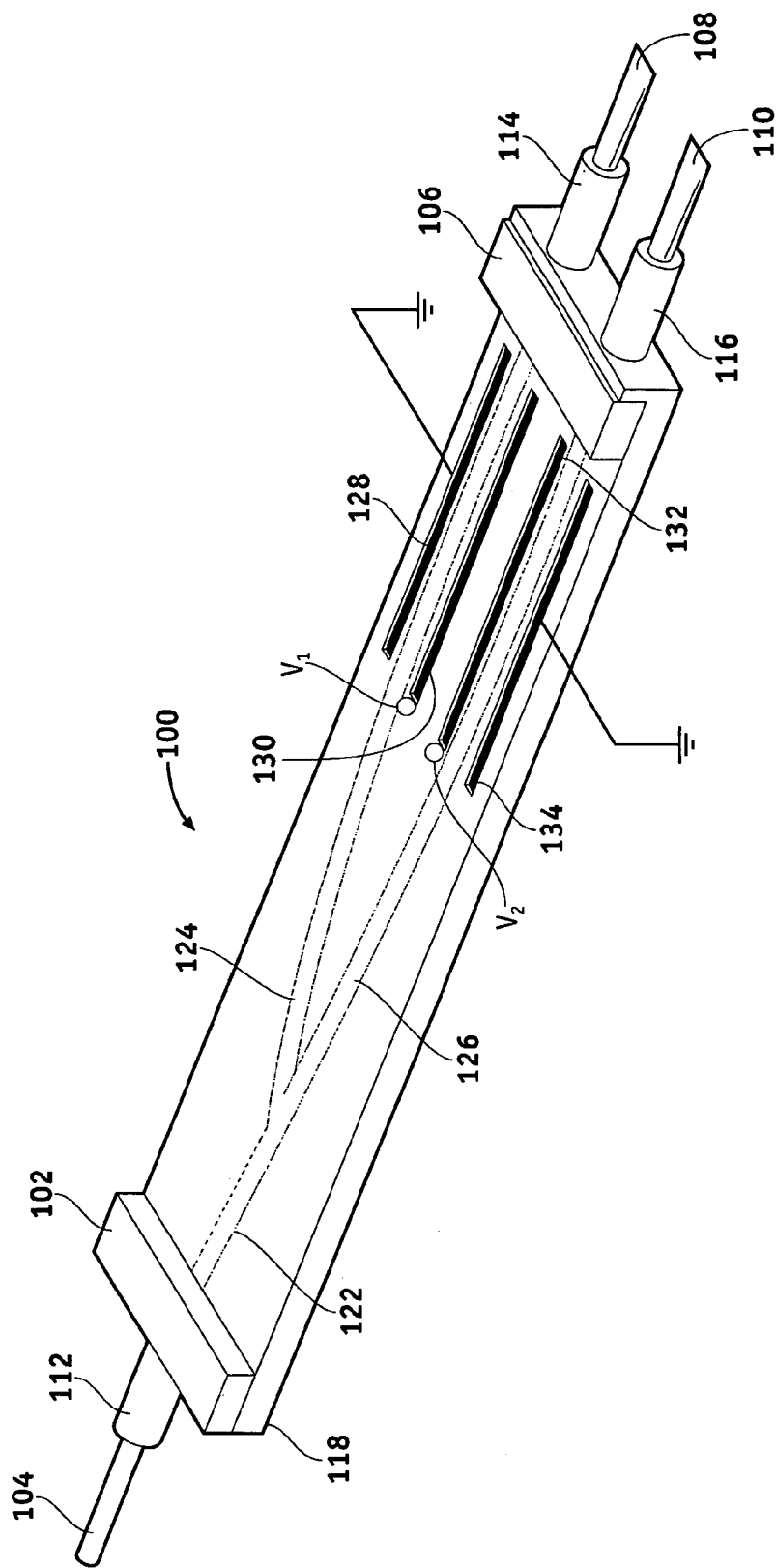
FIG. 1 is an isometric view of a dual output optical modulator.

FIG. 1 is an isometric view of a known electro-optic device 100 (e.g., an optical modulator) comprising a first end 102 optically coupled to an input optical fiber 104 and a second end 106 optically coupled to a first output optical fiber 108 and to a second output optical fiber 110. Optical fibers 104, 108, and 110 are coupled to electro-optic device 100 through ferrules 112, 114, and 116, respectively. An optically transmissive substrate 118 comprising an electro-optic crystal and extending from first end 102 to second end 106 of device 100 has an optical waveguide 122 formed therein. Substrate 118 may comprise a number of known electro-optic crystals including, but not limited to, beta barium borate ($\beta$-$BaB_2O_4$, or BBO), potassium titanyl phosphate ($KTiOPO_4$, or KTP), and lithium triborate ($LiB_3O_5$, or LBO); however, lithium niobate ($LiNbO_3$) is preferred. As can be seen in FIG. 1, waveguide 122 bifurcates into a first waveguide section 124 and a second waveguide section 126 for guiding light through substrate 118 and ultimately to output fibers 108 and 110, respectively. Waveguide sections 124 and 126 are configured to pass between first and second pairs of electrodes that are deposited on the upper surface of substrate 118. More particularly, waveguide section 124 passes between electrodes 128 and 130, and waveguide section 126 passes between electrodes 132 and 134.

Input fiber 104 delivers light into substrate 118 that separates into substantially a guided mode and an unguided mode; for example, an unguided transverse magnetic (TM) mode and a guided transverse electric (TE) mode. As it propagates along waveguide sections 124 and 126, the guided TE mode light passes between paired electrodes 128 and 130 and paired electrodes 132 and 134, respectively, which are each configured to have a voltage applied across them. For example, one electrode in each pair may be grounded, while the other electrode may have a voltage applied thereto. Referring specifically to FIG. 1, electrodes 128 and 134 may be grounded, electrode 130 may be coupled to a first voltage $V_1$, and electrode 132 may be coupled to a second voltage $V_2$. The index of refraction of waveguide sections 124 and 126 varies in response to the voltages applied to electrodes 130 and 132, and the optical signals traveling between the electrode pairs are correspondingly modulated.

As stated previously, while device 100 and other such electro-optic devices may perform adequately in moderate environments, their performance has been shown to degrade quickly when operating under atypical conditions due to chemical changes experienced by electro-optic substrate 118. For this reason, known electro-optic devices are poorly suited for operation in non-terrestrial environments. It accordance with the present invention, the following provides a method for stabilizing device 100 and other electro-optic devices to render them suitable for operation under atypical conditions by passivating the surface of substrate 118 and further sealing it to prevent environmental destabilization.

Figure 2:
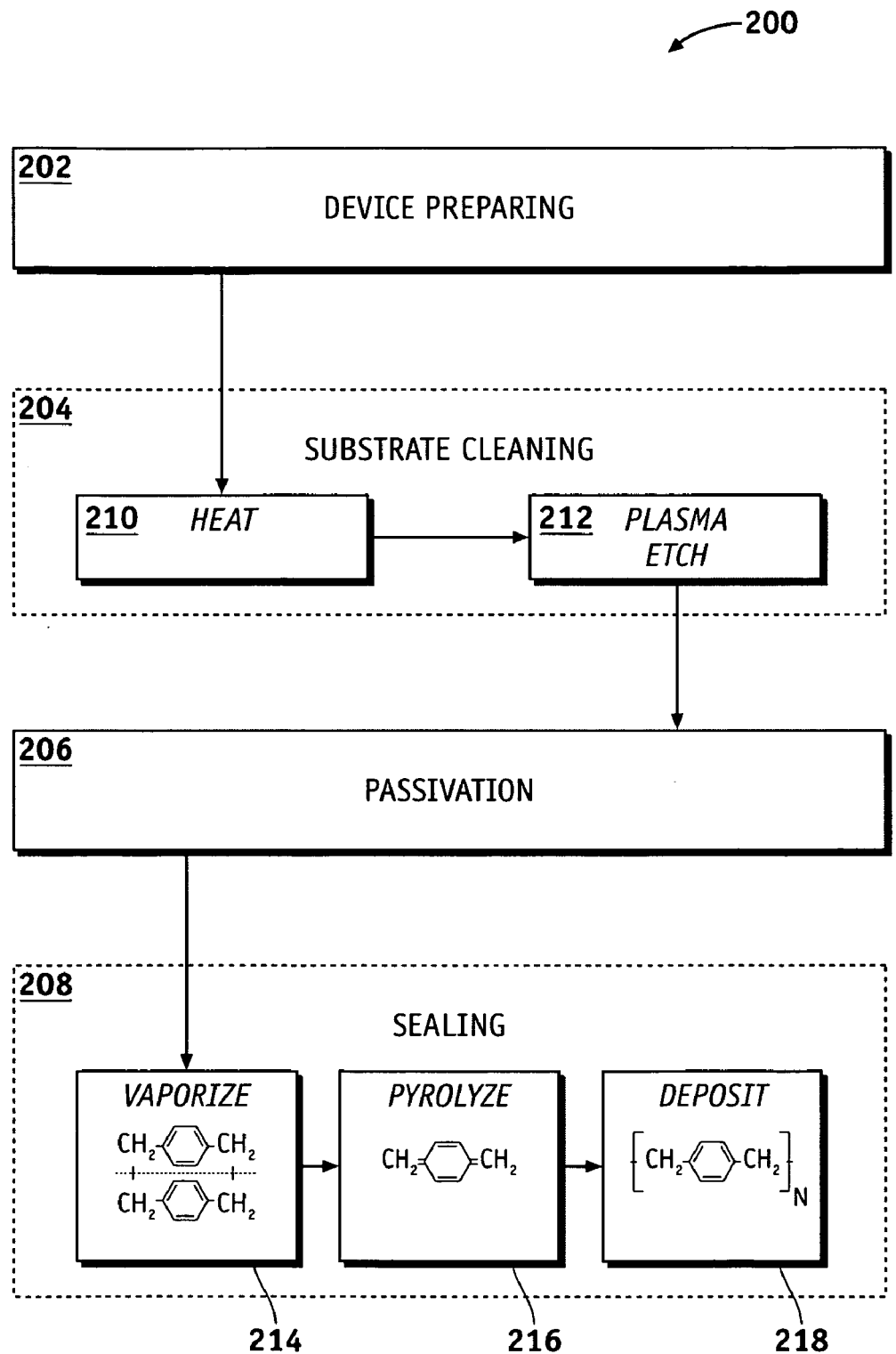
FIG. 2 is a flowchart illustrating an exemplary embodiment of the inventive stabilization method.

FIG. 2 is a flowchart illustrating an exemplary embodiment 200 of the inventive stabilization method. As can be seen, exemplary method 200 comprises four main steps: (1) Device Preparing 202, (2) Substrate Cleaning 204, (3) Passivation 206, and (4) Sealing 208. In addition, cleaning 204 and sealing 208 each comprise a number of sub-steps, which will be discussed in more detail below. Method 200 begins with device preparation 202 in which a subject electro-optic device, such as electro-optic device 100 described above in conjunction with FIG. 1, is readied for processing. The manner in which device 100 is prepared will vary with the condition in which the device is found. That is, if the device is packaged, the package may be inspected for damage and removed. If a faceplate exists over electro-optic substrate 118, it may also be removed. Furthermore, during device preparation, it may be wise to take steps to protect the more vulnerable components of device 100. For example, it may be desirable to cover the device's leads (not shown) with aluminum foil.

After device preparation is completed (step 202), the substrate may be cleaned (step 204) to remove foreign molecules (e.g., adventitious carbon) that may have collected on the surface of the substrate and to expose oxygen molecules that may bond with a reactive oxide, which is applied during passivation (step 206) as described in the subsequent paragraph. Cleaning may be accomplished in a number of ways. As indicated at 210 in FIG. 2, for example, device 100 may be heated in a vacuum chamber (e.g., at ~60° C. and ~60 cmHg for ~40 hours) to drive off water that has collected on substrate 118. Device 100 may then be plasma etched (step 212) in the well-known manner; that is, device 100 may be exposed to a charged plasma environment (e.g., oxygen, argon, etc.) within a suitable plasma chamber (e.g., of the type manufactured by Branson or IPC). In the exemplary method specifically, device 100 is exposed to oxygen gas flowing at approximately 50 cubic feet per minute for about 15 minutes while the chamber's RF power is held at approximately 80 watts. In addition to cleaning, plasma etching may also have the effect of repairing the surface of substrate 118 by replacing oxygen atoms that may have been lost during device processing.

After device 100 has been suitably cleaned (e.g., by etching using oxygen plasma), a passivation step 206 is performed wherein the surface of substrate 118 is rendered substantially environmentally inactive. This is accomplished by introducing a reactive oxide gas (e.g. carbon monoxide) into the chamber containing device 100, which may be the same chamber in which step 212 (etching) was performed. The reactive oxides bond with the free-oxygen bonds available at the surface of substrate 118 to reduce the mobility of lithium, oxygen and hydrogen ions along with any free charge carriers present thereon. For example, device 100 may be exposed to carbon monoxide gas at approximately one atmosphere for at least 30 minutes. However, it should be appreciated that other reactive oxide molecules may be employed during passivation 206, including sulfur monoxide. Additionally, if desired, a methyl siloxane (e.g., silane) may also be applied to the surface of substrate 118 for greater passivation and adhesion. After the substrate has been effectively passivated, the chamber is evacuated and device 100 is removed.

Lastly, device 100 is placed within a coating chamber and a sealing step 208 is performed. In this step, a thin film of sealing material is deposited on surface of substrate 118 to maintain the surface at its controlled and stabilized condition. For example, silicon dioxide (SiOx) may be deposited on the surface of substrate 118 via ion beam assisted deposition, chemical vapor deposition, or another known deposition method. Alternatively, the sealing material may be from the poly-para-xylylene family and deposited via chemical vapor deposition, as indicated in FIG. 2. Though any suitable member from this family may be utilized (e.g., para-xylylene D, para-xylylene N, etc.), para-xylylene C is preferred. Vapor deposition begins when a dimer powder (di-para-xylylene) is heated to a temperature of approximately 150° C. whereat the powder vaporizes into a gas (step 214). Next, the para-xylylene gas diffuses into a pyrolysis furnace wherein it is heated to a temperature of approximately 650° C., which is sufficient to break the dimers' molecular bonds and thereby convert the para-xylylene dimers to monomers (step 216). Under vacuum, the monomeric para-xylylene molecules move into the coating chamber containing electro-optic device 100. The coating chamber is held at a temperature at which the para-xylylene molecules become a solid polymer (e.g., room temperature) conformally coating the exposed surfaces of electro-optic device 100. Deposition of the sealant occurs as the solid para-xylylene polymer bonds to the exposed portions of device 100 including the surface of substrate 118 (step 218), and excess gas is captured in a liquid cold trap external to the coating chamber. After a polymeric layer of sufficient thickness (e.g., at least 1 mil nominal) has been deposited on the surface of substrate 118, the coating chamber may be evacuated and device 100 may be removed. Method 200 is now completed and substrate 118 of device 100 has been stabilized and sealed such that device 100 may operate under atypical conditions for extended periods of time with little to no degradation in performance.

It should thus be appreciated that there has been provided a method for adapting known electro-optic devices for operation under atypical conditions, such as those found in space-like environments and radiation (e.g., x-ray) rich environments. Though the inventive method was described above in conjunction with a specific embodiment, it should be understood that certain aspects of method 200 may be altered or eliminated without departing from the scope of the invention. For example, though a preparation step and a cleaning step were described above as part of exemplary method 200, these steps may not always be necessary or desirable in the performance of the inventive method.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for stabilizing an optically transmissive substrate, the method comprising:
    passivating a surface of the substrate with a reactive oxide; and
    sealing the surface by depositing silicon dioxide thereon.

2. A method according to claim 1 wherein the sealing comprises performing ion beam assisted deposition.

3. A method according to claim 1, wherein the sealing comprises performing chemical vapor deposition.

4. A method according to claim 3 wherein the layer has a minimum thickness of approximately 1 millimeter.

5. A method according to claim 1 wherein the substrate comprises lithium niobate.

6. A method according to claim 1 further comprising plasma etching the surface with an oxygen gas.

7. A method for stabilizing an optically transmissive substrate, the method comprising:
    passivating a surface of the substrate by exposing the surface to sulfur monoxide; and
    sealing the surface.

8. A method according to claim 1 wherein the passivating comprises exposing the surface to carbon monoxide.

9. A method for stabilizing an optically transmissive substrate, the method comprising:
    passivating a surface of the substrate with a reactive oxide;
    treating the surface with a methyl siloxane; and
    sealing the surface.

10. A method for stabilizing an electro-optic substrate employed in a waveguide device, the method comprising:
    cleaning a surface of the substrate;
    exposing the device to a reactive oxide to passivate the surface; and
    depositing a layer of silicon dioxide on the substrate in a vacuum to seal the surface.

11. A method according to claim 10 wherein the cleaning comprises heating and plasma etching the surface.

12. A method according to claim 10 wherein the layer has a minimum thickness of approximately 1 millimeter.

13. A method according to claim 10 wherein the exposing comprises subjecting the surface to carbon monoxide at a predetermined pressure for a predetermined time.

14. A method according to claim 11 wherein the predetermined pressure is approximately 1 atmosphere and the predetermined time is approximately 30 minutes.

15. A method according to claim 10 further comprising treating a surface of the substrate with a methyl siloxane.

* * * * *